(12) United States Patent
Russell

(10) Patent No.: US 6,516,560 B1
(45) Date of Patent: Feb. 11, 2003

(54) HANDLING OF MUSHROOMS

(75) Inventor: Tony Albert Russell, Norwich (GB)

(73) Assignee: Pick and Pack Systems Ltd., Norfolk (GB)

( * ) Notice: Subject to any disclaimer, the term of this patent is extended or adjusted under 35 U.S.C. 154(b) by 0 days.

(21) Appl. No.: 09/284,583

(22) PCT Filed: Oct. 15, 1997

(86) PCT No.: PCT/GB97/02893

§ 371 (c)(1),
(2), (4) Date: Apr. 15, 1999

(87) PCT Pub. No.: WO98/16098

PCT Pub. Date: Apr. 23, 1998

(30) Foreign Application Priority Data

Oct. 16, 1996 (GB) ............................................... 9621582

(51) Int. Cl.⁷ .......................... A01G 1/04; B65D 85/52
(52) U.S. Cl. .......................................... 47/1.1; 206/423
(58) Field of Search .............................. 47/1.1, 84, 85, 47/86; 206/521.6, 562, 423, 585, 199, 564, 140, 561, 144, 558, 521.15; 220/510, 512; 229/120.32, 120.08, 120.06, 120.34, 120.37, 221, 120.03, 125.21, 125.37, 125.22, 120.07, 120.22, 120.23, 120.33, 120.35, 120.05, 120.12, 120.15, 120.28, 120.29; 426/108, 119

(56) References Cited

U.S. PATENT DOCUMENTS

| 1,690,852 A | * | 11/1928 | Behrman ..................... 229/102 |
| 1,759,716 A | * | 5/1930 | Schinscholl ............ 206/521.15 |
| 2,358,295 A | * | 9/1944 | Bacigalupi .................. 206/423 |
| 2,453,574 A | * | 11/1948 | Hill ............................. 229/120 |
| 2,653,742 A | * | 9/1953 | Currie ......................... 206/196 |
| 2,676,731 A | * | 4/1954 | Klein ........................... 206/183 |
| 2,771,236 A | * | 11/1956 | Claff et al. ............ 229/117.14 |
| 2,990,995 A | * | 7/1961 | Wessel ........................ 206/510 |
| 3,084,790 A | * | 4/1963 | Vander Lugt ............... 206/562 |
| 3,284,949 A | * | 11/1966 | Park .............................. 47/84 |
| 3,366,305 A | * | 1/1968 | Cohen et al. ............... 206/562 |
| 3,840,171 A | * | 10/1974 | Waters ........................ 206/562 |
| 3,924,354 A | * | 12/1975 | Gregoire ..................... 47/41.01 |
| 4,170,301 A | * | 10/1979 | Jones et al. ................. 206/423 |
| 4,193,532 A | * | 3/1980 | Okubo ........................ 229/221 |
| 4,472,929 A | * | 9/1984 | MacCanna et al. ........ 56/327.1 |
| 4,560,064 A | * | 12/1985 | Peterson et al. ............ 206/159 |
| 5,234,375 A | * | 8/1993 | Hendriks ................... 56/327.1 |
| 5,333,751 A | * | 8/1994 | Santucci, Sr. ............... 206/423 |
| 5,463,858 A | * | 11/1995 | Ciuffetelli .................. 56/327.1 |
| 5,659,997 A | * | 8/1997 | Sprehe et al. ................. 47/1.1 |

FOREIGN PATENT DOCUMENTS

| FR | 2313283 | * | 12/1976 | ................. 47/84 B |
| JP | 401285125 | * | 11/1989 | |
| JP | 406007032 | * | 1/1994 | .................... 47/1.1 |

* cited by examiner

Primary Examiner—Peter M. Poon
Assistant Examiner—Son T. Nguyen
(74) Attorney, Agent, or Firm—Andrus, Sceales, Starke & Sawall, LLP

(57) ABSTRACT

Mushrooms harvested from a growing bed are deposited on a carrier having a plurality of individual recesses each for receiving an individual mushroom by supporting the underside of the cap with the stalk projecting downwardly. The carrier, when fully loaded with mushrooms, is moved into a compartment of a multi-compartmented storage structure configured to allow the flow of air therethrough. The structure is then moved into a cold room so that all of the carried mushrooms are cooled down to the optimum storage temperature. Only when the mushrooms are to be dispatched for sale are the carriers removed from the storage structure and the stalks of the mushrooms trimmed to the required length whereafter the mushrooms are suitably packed for dispatch and sale.

19 Claims, 6 Drawing Sheets

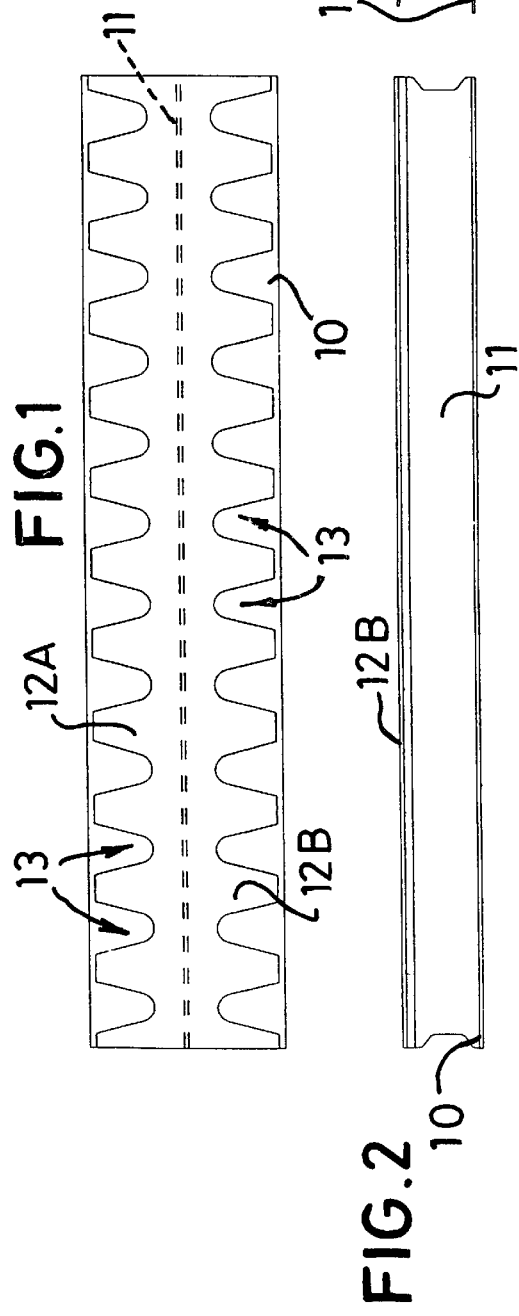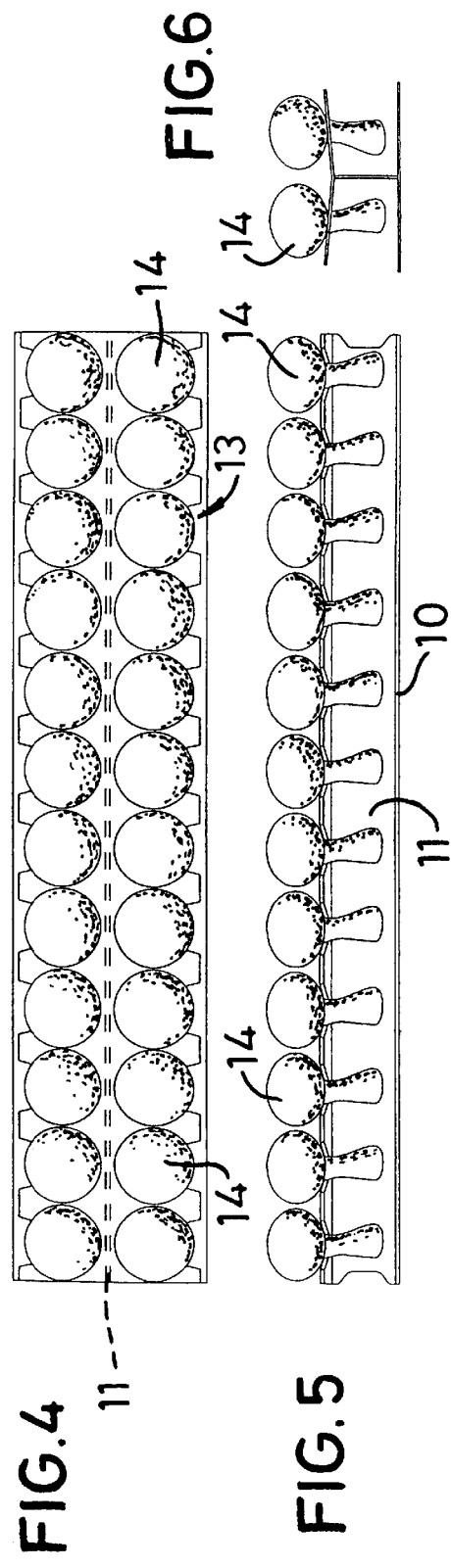

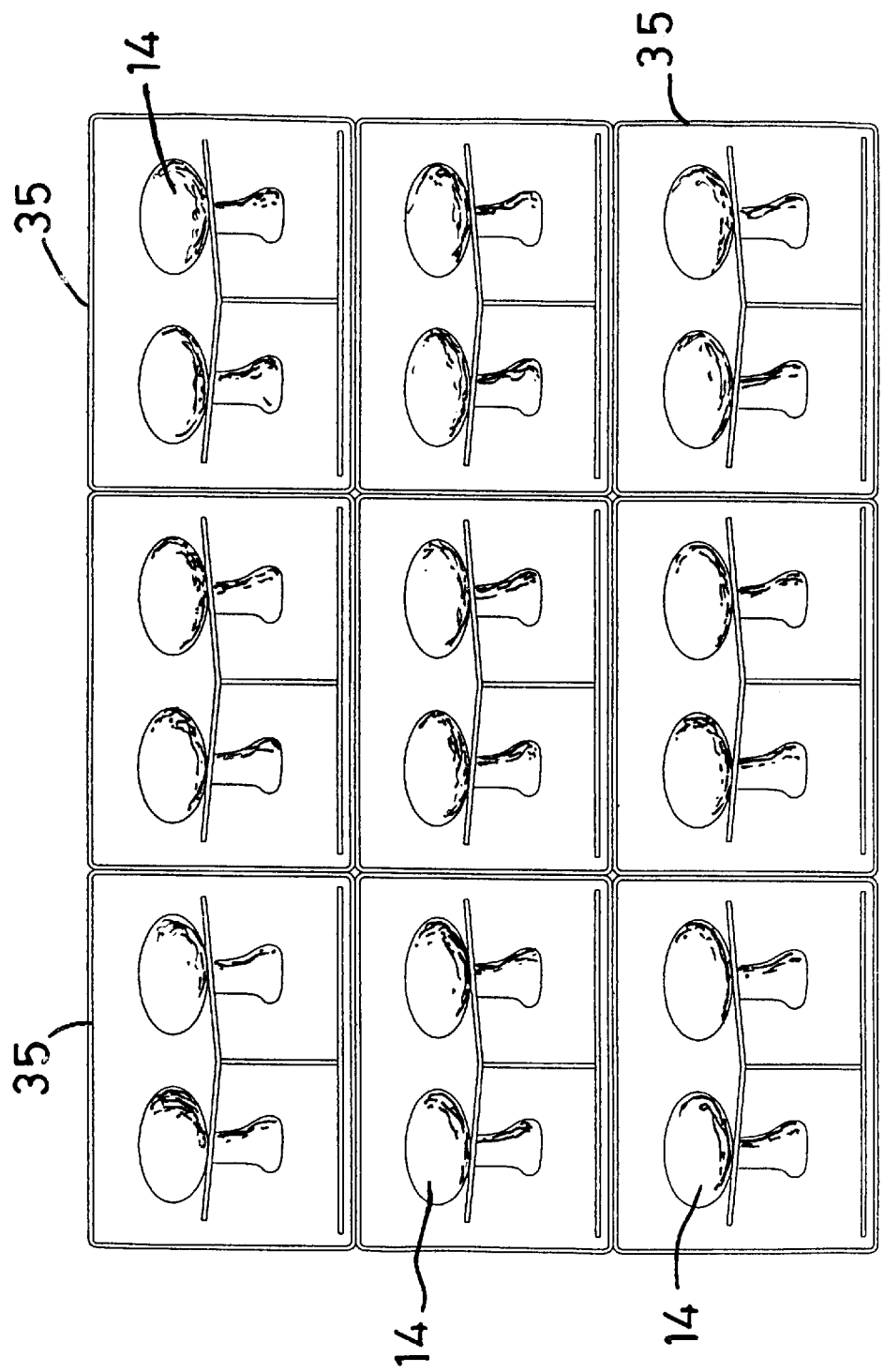

HANDLING OF MUSHROOMS

This invention relates to methods of handling mushrooms, and in particular to the harvesting of mushrooms and the handling of those mushrooms immediately after the harvesting thereof. The invention further relates to apparatus for use in such handling methods.

Automated systems for the harvesting of mushrooms are known, but they tend to cause some damage to the mushrooms. Consequently, it is the usual practice to harvest by hand mushrooms intended for fresh retail sale, and mechanically-harvested mushrooms are usually used in the food processing industries, such as for soup or canning.

Manually harvested mushrooms are usually either cut by a picker from a growing bed, or may simply be pulled from the growing bed whereafter the stalk is cut to the required length. The mushrooms are then manually graded by size and are placed in appropriate packs or baskets by the picker. The full packs or baskets are collected and transferred to a cold store for cooling, for approximately 25 minutes, after which the packs are wrapped, usually by stretch-wrapping. The packs can then be dispatched direct to a wholesale or retail outlet, or may remain in the cold store awaiting dispatch The shelf life of mushrooms harvested in the above manner for fresh retail sale is relatively short and is adversely affected by (a) the cutting of the stalk, (b) the amount of handling prior to cooling, (c) the time between picking and cooling and (d) the time taken fully to cool the mushrooms. In addition, apart from general deterioration of the mushrooms, these factors also affect the tendency of the mushrooms to discolour with time, and so be less attractive to the ultimate purchaser Each retail outlet usually specifies the numbers of packs of mushrooms it requires day by day, the minimum weight of each pack and the grade (size) of the mushrooms in those packs. Unfortunately, growers cannot reliably have available for harvesting the required numbers of mushrooms of the required grade and this often leads to difficulties for the retail outlets in obtaining the supplies they believe their customers will require. In view of the very short shelf life of harvested mushrooms, attempts at storing the mushrooms until required for retail sale have not been very successful generally it is necessary for a mushroom farm to harvest, cut the stalks to the required length, cool, pack and dispatch the mushrooms to the wholesale or retail outlets all on the same day.

There are other problems associated with the known procedures in particular, the use of sharp knives for harvesting and/or stalk cutting is a growing concern, having regard to health and safety requirements in modern industries. The quality checking of full packs is not possible, for only the surface layer of the mushrooms can be checked visually. Moreover, the picker cannot select mushrooms to produce a pack of precisely the required weight; rather, the pack is filled until its weight exceeds some predetermined value but by then the actual weight in the pack may be significantly greater than the required weight In turn, this leads to considerable loss by the grower.

The present invention addresses the above problems, and in particular concerns the handling of the mushrooms at the time they are harvested In such a way that it is possible to store the mushrooms for longer than has otherwise been thought practical.

According to the present invention, there is provided method of handling mushrooms, comprising the steps of:

harvesting the mushrooms from a growing bed, leaving at least the greater part of the stalk still intact and connected to the cap;

depositing each harvested mushroom on a respective carrier therefor, which said carrier is configured to support the underside of the cap of the mushroom, with the stalk hanging free from the cap;

loading a plurality of mushrooms each supported as aforesaid into a compartment of a multi-compartmented storage structure arranged to allow the flow of air through the compartments thereof; and moving the storage structure into a cold-room following the loading of at least some of the compartments of the structure with supported mushrooms, thereby to cool for storage all of the loaded supported mushrooms.

By using the method of the present invention, the handling of the mushrooms may be significantly reduced prior to the mushrooms being cooled. Moreover, since the stalk is left connected to the cap and is not shortened to the final required length for retail sale, the shelf life of the mushrooms is greatly extended. By employing the steps of this invention at the time of harvesting the mushrooms, the mushrooms may be stored for longer periods before significant deterioration takes place and only when the mushrooms are to be packed for retail sale, following a period of storage, are the stalks cut to the required length and the mushrooms graded for packing. In turn, this reduces the likelihood of the mushrooms exhibiting damage at the time of sale, as the mushrooms have been cooled before cutting and required handling for cutting is performed just before the mushrooms are packed for despatch, rather than prior to storage. These steps of cutting and packing may be performed on at least a semi-automatic, if not a wholly automatic, basis. This again reduces the time taken to perform the steps and also reduces the handling to which the mushrooms would otherwise be subjected.

In the handling method of the present invention, the time between the harvesting of the mushrooms and the cooling thereof can be greatly reduced, especially if the mushrooms are grown in trays containing the growing medium and the trays are then taken to the station at which the harvesting is performed. This may be contrasted with the conventional manual picking procedure where the picking operation is performed in a growing shed, and the stalk cutting and grading operations are also performed there. The mushrooms could however be grown in fixed beds, trays or aligned bags containing growing medium, and then picked either by hand or by an automated harvester which travels over the beds.

Though the mushrooms could be harvested by cutting the stalk with a sharp knife at or in the immediate vicinity of the surface of the growing bed, it is much preferred that each mushroom is harvested by substantially simultaneously twisting and pulling the cap away from the growing medium. In this way, the stalk may be left wholly intact, the lower end of the stalk breaking away from the mycelium in the growing medium.

It would be possible to provide an individual carrier for each mushroom. It is however far more efficient to provide a carrier adapted to support a plurality of mushrooms, with each mushroom separated from its neighbours. Conveniently, the carrier is in the form of an elongate strip appropriately configured to support at least one row, but preferably two rows, of mushrooms In the latter case, the strip may include appropriate recesses along its two long edges so that mushrooms may be located in the region of each recess and with the stalks of the mushrooms projecting downwardly through the recesses.

As the mushrooms are arranged on the carriers with the stalks substantially intact, it is likely that there will be some growing medium adhering to the stalks. In order to prevent that growing medium failing on other mushrooms also being stored in the storage structure, it is advantageous for the carrier to provide a wall portion below the bottom of the stalks of the carried mushrooms.

The storage structure may comprise a framework having members appropriately disposed to define a plurality of compartments, each compartment sized to receive a carrier together with the mushrooms supported thereby Thus, the storage structure conveniently may be in the form of a trolley defining a rectangular matrix of the compartments, to permit the storage structure easily to be moved from the station at which it is loaded with the carriers to a cold room for the cooling of the mushrooms.

The storage structure should allow the free flow of cool air through the various compartments, in order to facilitate the cooling of the mushrooms as quickly as possible down to the optimum storage temperature. Depending upon the configuration of the storage structure, that air flow may be transverse to the length of the carriers, or may be parallel thereto.

It will be appreciated that at least one of, but preferably both of, the loading and unloading of the mushrooms on and from the storage structure may be performed on an automatic basis using appropriate automated (robotic) apparatus. Such unloading apparatus as may be used should also be capable of placing the mushrooms in packaging therefor.

This invention extends to apparatus for use in the handling methods of the invention as described above. Thus, according to a second aspect of the present invention, there is provided apparatus for the storage of harvested mushrooms, which apparatus comprises a multi-compartmented storage structure having openings through the compartments to permit the free flow of air therethrough, in combination with a plurality of carriers for harvested mushrooms, each carrier being adapted to support the underside of a mushroom cap with the stalk projecting downwardly therefrom.

The storage structure may be in the form of an open framework of slats, rod-like or similar members. In the alternative, the storage structure may be constructed from sheet materials in either case, conventional engineering techniques may be employed to manufacture the structure, Conveniently, the structure is in the form of a wheeled trolley to permit the easy movement thereof, from place to place.

Each carrier may be in the form of a moulded plastics strip, provided with a plurality of U-shaped recesses each to receive a respective harvested mushroom The carrier may itself be of inverted channel shape, with the recesses formed in the base wall of the channel and the webs of the channel being cut away in order to provide lateral access to the recesses. In an alternative embodiment, the carrier may have upper and lower elongate strip-like walls held in a parallel and spaced apart disposition by a vertical web arranged centrally between the upper and lower walls. The upper wall may then be provided with U-shaped recesses along both long edges thereof, for receiving the mushrooms. The lower wall may serve as a base for the carrier and also to collect any growing medium or other debris adhering to the caps or the stalks of the mushrooms loaded onto the carrier. In order to assist retention of the mushrooms on this carrier, the upper wall may be slightly V-shaped, in order to encourage loaded mushrooms to move towards the vertical web.

In a further form of carrier of this invention, the mushrooms are supported on a plurality of elastic strips stretched between holders therefore, arranged along opposed upper edges of a channel-shaped member In this case, the base of the channel-shaped member may collect any growing medium falling from the mushrooms.

By way of example only, certain specific embodiments of storage structure and carriers for mushrooms, for use in the methods of this invention, will now be described in detail, reference being made to the accompanying drawings, in which.

FIG. 1 is a plan view of a first embodiment of mushroom carrier;

FIG. 2 is a side view of the mushroom carrier shown in FIG. 1;

FIG. 3 is an end view of the mushroom carrier shown in FIG. 1;

FIGS. 4, 5 and 6 are respectively plan, side and end views of the carrier of FIGS. 1 to 3 but when loaded with mushrooms;

FIG. 18 is a view on an enlarged scale of a typical nine-compartment structure corresponding generally to that of FIG. 14 but fabricated from individual tubes.

Figure 7:
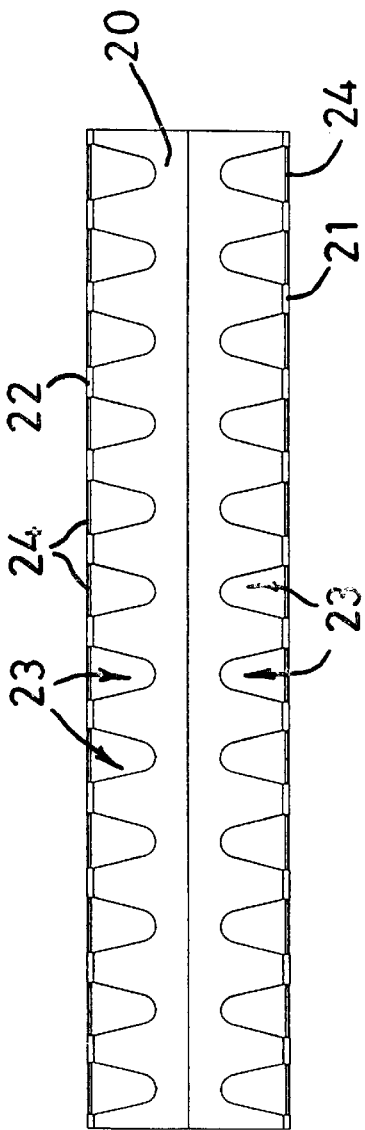
FIG. 7 is a plan view of a second embodiment of mushroom carrier.
Figure 8:
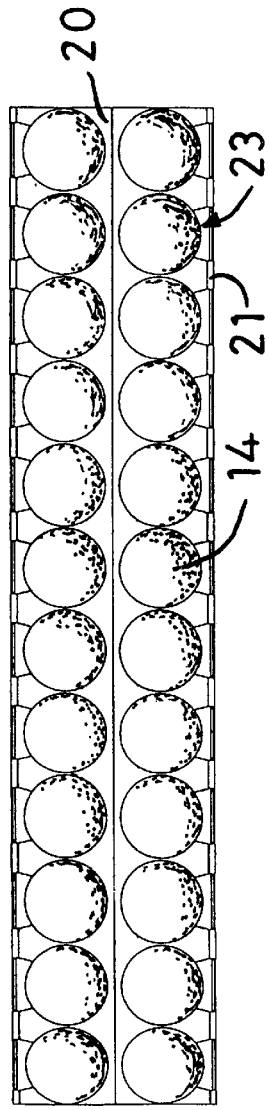
FIGS. 8, 9 and 10 are respectively plan, side and end views of the carrier of FIG. 7 but when loaded with mushrooms.
Figure 9:
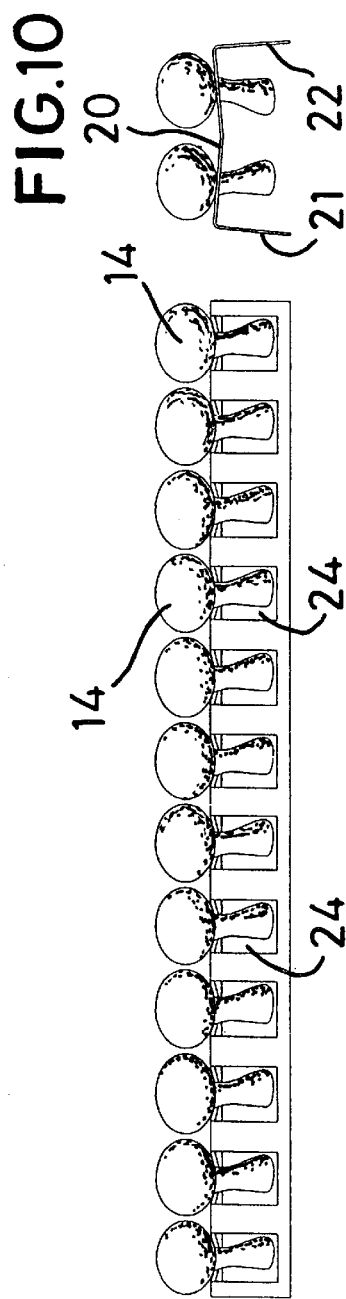
Figure 10:
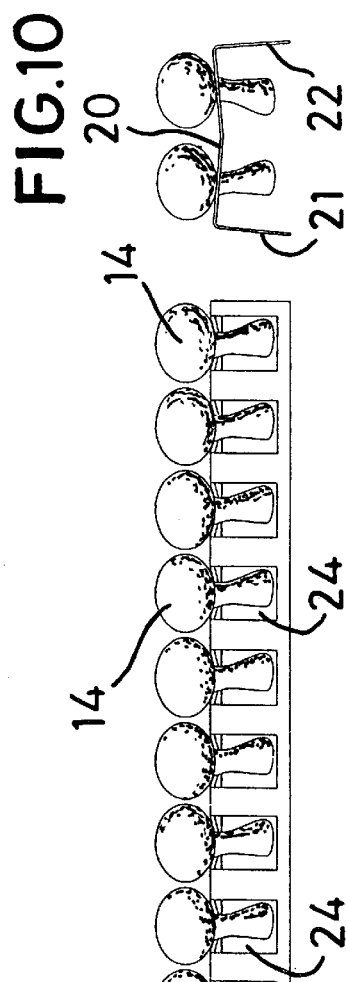

FIGS. 1 to 3 illustrate a carrier which is typically moulded from a plastics material and which Is adapted to support twenty four mushrooms still having their stalks attached, with the mushrooms essentially separate from one another. The carrier comprises an elongate strip-like base wall 10 from which upstands a vertical web 11, disposed centrally of the base wall. An upper wall 12 is attached to the upper edge of the web 11, so as to extend over the base wall 10, the upper wall being in two parts 12A and 12B lying at a small angle to one another. Along the free edges of the upper wall parts 12A and 12B are formed a plurality of generally U-shaped recesses 13, each appropriately sized to accommodate typical mushrooms with which the carrier is to be used. FIGS. 4 to 6 show the carrier of FIGS. 1 to 3, but loaded with mushrooms 14. As can be seen in FIG. 6, the underside of the cap of each mushroom bears on the carrier. Each mushroom is encouraged to move towards the base of its respective recess, by virtue of the angle to the horizontal of the wall portion in which the recess is formed.

The base wall 10 serves to collect any debris which may fall from the supported mushrooms, such as growing medium adhering to the stalks. In addition, the base wall 10 serves stably to support the carrier, both when it is being loaded with mushrooms and subsequently when it has been located in a compartment of a storage structure.

FIGS. 7 to 10 show an alternative form of carrier, which again is conveniently moulded from a plastics material. This carrier is of inverted channel-shape and comprises a channel base 20 and two side walls C-flanges 21 and 22, projecting downwardly from the base 20. Twenty four recesses 23 are formed in the channel base 20, twelve recesses formed along each side thereof. Corresponding slots 24 are provided in the side walls 21 and 22, in alignment with the recesses 23, to allow mushrooms to be inserted sideways into the recesses 23. The mushrooms could however be inserted vertically downwardly, instead.

As with the first embodiment of carrier, the wall 20 is slightly V-shaped, to encourage each mushroom to move towards the centre line of the carrier.

Figure 13:
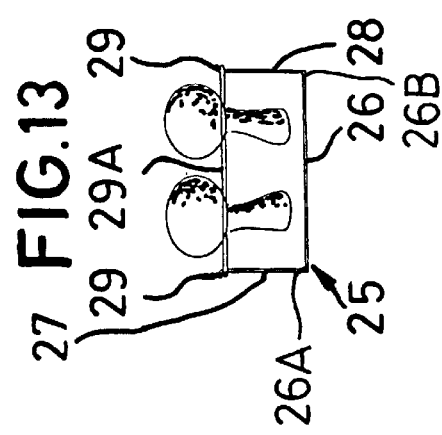
FIGS. 11, 12 and 13 are respectively plan, side and end views of a third embodiment of mushroom carrier, loaded with mushrooms.
Figure 11:
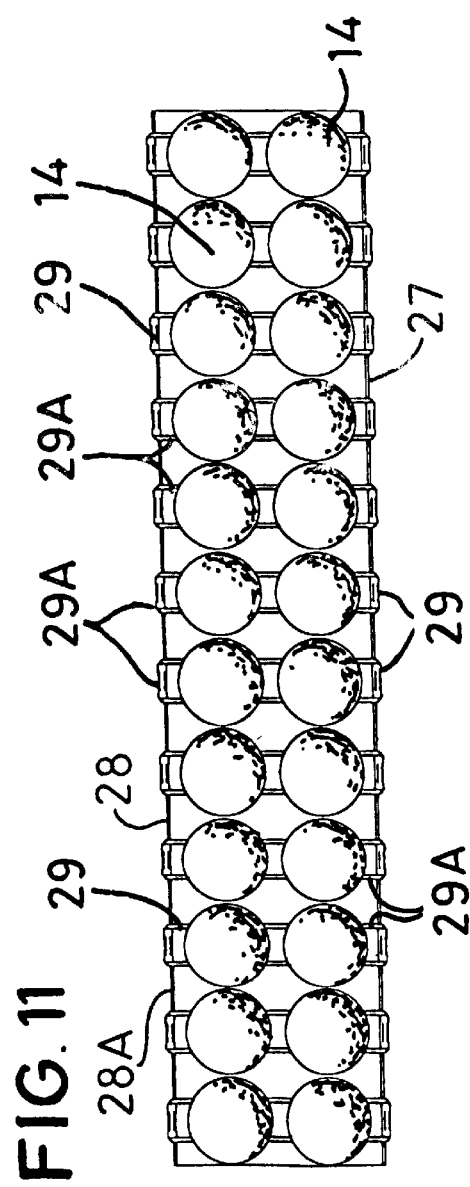
Figure 12:
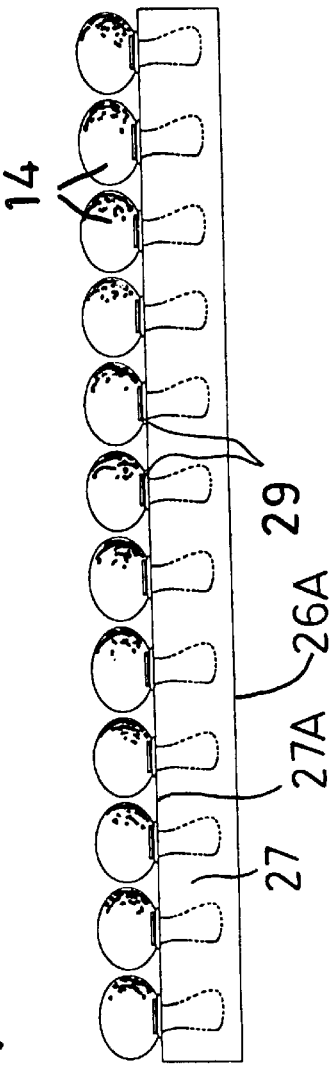

FIGS. 11 to 13 show a third embodiment of carrier. This embodiment comprises a channel-shaped member 25 having a base wall 26 and two side walls (flanges) 27 and 28 upstanding from the base wall, along the long edges 26A and 26B thereof. Each side wall has twelve hook portions 29 formed along the upper edge 27A and 28A thereof, the hook portions on one side wall being aligned with those of the other side wall. Endless elastic bands 29A are stretched around the aligned hook portions, whereby each elastic band may support two mushrooms, side by side, the cap of each mushroom resting on the elastic bands with the stalk projecting downwardly between the two runs of the associated band.

Figure 15:
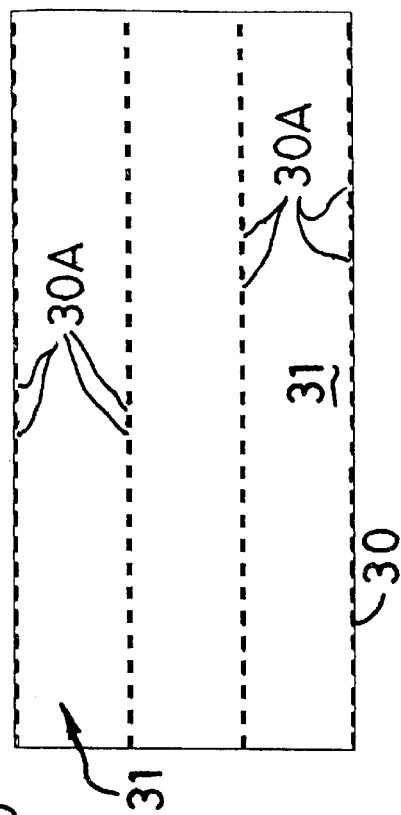
FIGS. 14 and 15 are respectively end and side views of a simple nine-compartment storage structure.
Figure 14:
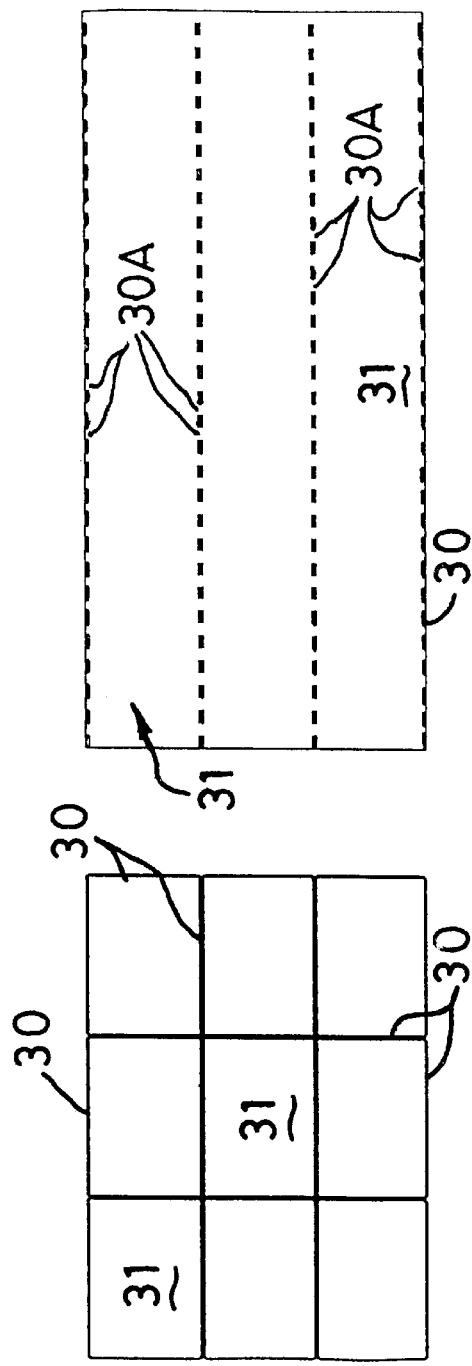
Figure 17:
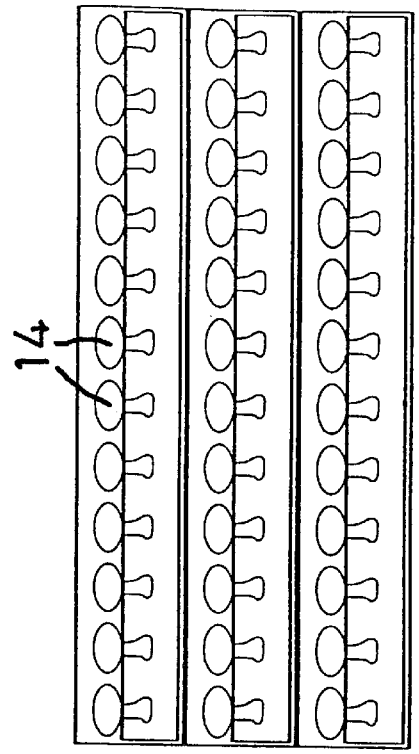
FIGS. 16 and 17 are respectively end and side views of the structure of FIGS. 14 and 15 but with carriers loaded with mushrooms located in each compartment.
Figure 16:
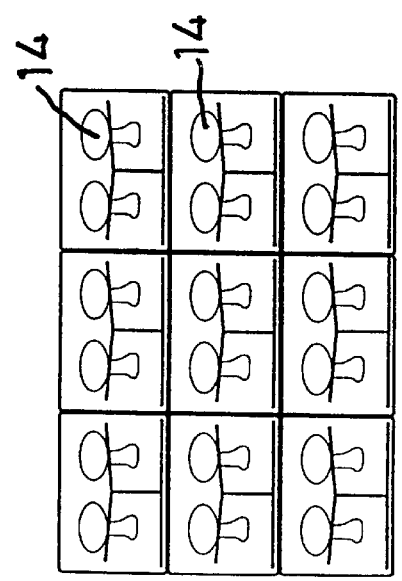

FIGS. 14 and 15 show a relatively simple nine-compartment storage structure, assembled from a plurality of individual slats 30 with openings 30A between the slats The compartments 31 are in a 3×3 rectangular array. Each compartment is appropriately sized in order that a carrier such as that shown in FIGS. 1 to 3 may be located therein, when loaded with mushrooms, as shown in FIGS. 16 and 17. The structure has no end walls, so that there may be a free flow of air through the compartments, parallel to the length of each carrier loaded therein. If the structure is fabricated from slats, the sides may be open, to allow the free flow of air laterally across the structure.

FIG. 18 shows an alternative construction for the storage structure of FIGS. 14 and 15. This storage structure is fabricated from nine box members 35, held together in a 3×3 matrix in an appropriate manner. Carriers such as those shown In FIGS. 1 to 3 and loaded with mushrooms are located one in each box member compartment.

Figure 20:
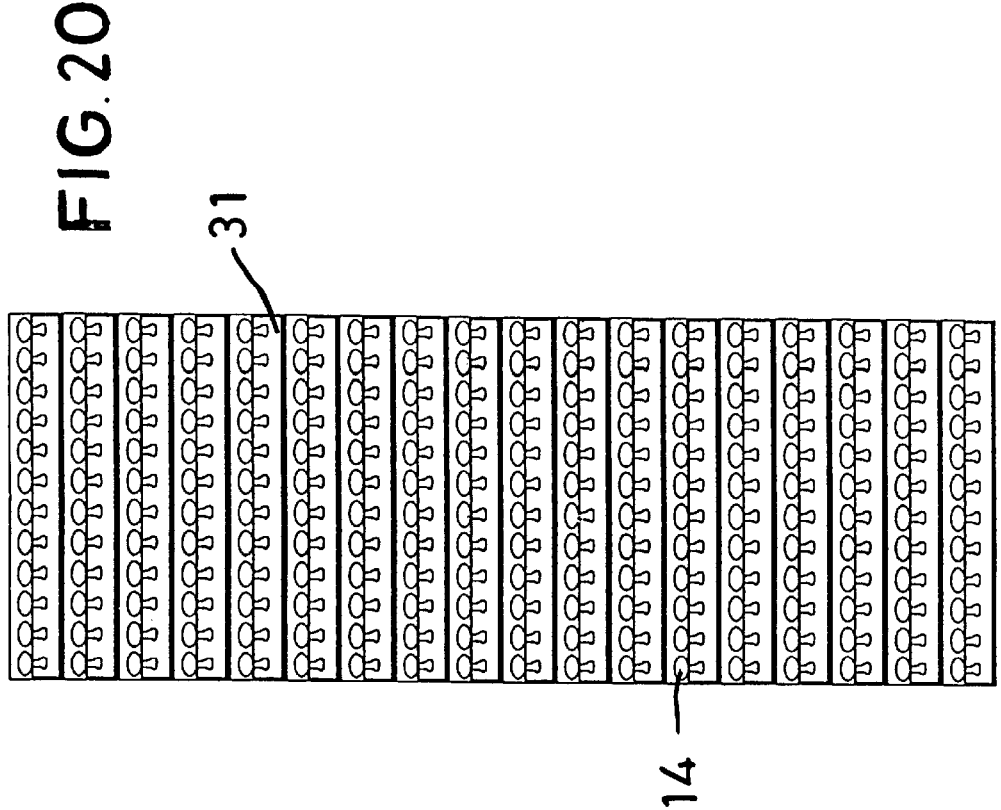
FIGS. 19 and 20 are respectively end and side views of a multi-compartmented storage structure, having carriers loaded with mushrooms located in each compartment thereof.
Figure 19:
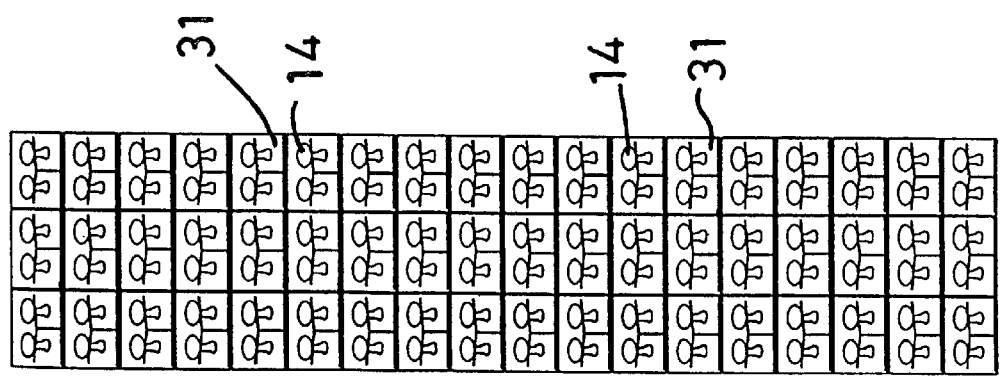

FIGS. 19 and 20 show another storage structure of this invention, arranged as an 18×3 array. This structure may be fabricated in any suitable manner—for example, six such structures as shown in FIG. 18 could be stacked vertically and locked together in some appropriate manner Alternatively, the structure could be constructed so as to have the form illustrated in FIGS. 19 and 20, using an open work assembly of slats or other suitable members.

It will be appreciated that the carriers and storage structures as described above together allow the performance of the handling method of the present invention. Typically, mushrooms grown in growing medium carried in a tray are moved from a growing shed to a harvesting station and only those mushrooms of an appropriate size are harvested. The tray is then returned to the growing shed, to permit any other mushrooms still in the tray to grow to a sufficient level of maturity for subsequent harvesting.

The mushrooms should be harvested by grasping the cap and simultaneously twisting and pulling the mushroom so as to break the bottom of the stalk from the mycelium in the growing medium, leaving the entire stalk intact. Each mushroom, as it is harvested, should immediately be placed on the selected design of carrier—for example, that of FIGS. 1 to 3. The picker may exercise a degree of grading at this time, in that the picker may have immediate access to two or three such carriers and place each mushroom in the appropriate carrier for a particular size range.

Each carrier, when fully loaded with mushrooms, may quickly be located into a compartment of a storage structure and the storage structure then moved to a cold store. Preferably there is forced cooling in that store and the storage structure is arranged to optimise the flow of cool air over the mushrooms in order to bring the temperature of those mushrooms down to the appropriate storage temperature.

When the mushrooms are to be dispatched to a retail outlet, the carriers are removed from the storage structure and packs of mushrooms assembled by selecting the mushrooms for packing, cutting the stalks to the required length, and then neatly depositing the mushrooms in layers in the pack or container specified by the ultimate vendor. The pack may then be shrink-wrapped and dispatched to the retail outlet.

What is claimed is:

1. A method of handling mushrooms, comprising the steps of:
    harvesting the mushrooms from a growing bed, leaving at least the greater part of the stalk still intact and connected to the cap;
    depositing each harvested mushroom on a respective carrier therefor, which said carrier is configured to support the underside of the cap of the mushroom, with the stalk hanging free from the cap, said carrier being in the form of an elongate strip having a first surface for supporting the undersides of the mushrooms and a web depending downwardly from said first surface which web is adapted to support said first surface, the first surface having a plurality of generally U-shaped recesses along the length thereof whereby an individual mushroom may be located in each such web by moving the mushroom laterally with respect to the length of the carrier;
    loading a plurality of mushrooms each supported as aforesaid into a compartment of a multi-compartmented storage structure arranged to allow the flow of air through the compartments thereof; and
    moving the storage structure into a cold-room following the loading of at least some of the compartments of the structure with supported mushrooms, thereby to cool for storage all of the loaded supported mushrooms.

2. A method as claimed in claim 1, wherein the growing bed comprises a mass of growing medium provided in one of a fixed bed and over which bed an automated harvester is moved to harvest the mushrooms.

3. A method as claimed in claim 1, wherein the growing bed comprises a mass of growing medium provided in a tray normally positioned in a growing room, but which tray is moved to a harvesting station for the harvesting step.

4. A method as claimed in any of the preceding claim 1, wherein each mushroom is harvested by cutting the stalk at or in the immediate vicinity of the surface of the growing bed.

5. A method as claimed in claim 1, wherein each mushroom is harvested by substantially simultaneously twisting and pulling the cap away from the growing bed, so breaking the lower end of the stalk away from mycelium in the growing bed.

6. A method as claimed in claim 1, wherein each carrier is adapted to support a plurality of mushrooms, in a substantially spaced apart manner.

7. A method as claimed in claim 6, wherein each carrier is arranged to support a plurality of mushrooms, in two substantially parallel rows.

8. A method as claimed in claim 7, wherein the carrier is in the form of an elongate strip having two long edges and defining a plurality of U-shaped recesses along said two long edges, of and individual mushroom being locatable in each such recess.

9. A method as claimed in claim 7, wherein each carrier provides a wall portion below the bottom of the stalks of carried mushrooms.

10. A method as claimed in claim 1, wherein the storage structure is provided with air-flow openings to permit the free flow of air transverse to the length of carried rows of mushrooms.

11. A method as claimed in claim 1, wherein the cold-room temperature is maintained at an appropriate temperature for the optimum storage of mushrooms.

12. A method as claimed in claim 1, wherein cooled air is caused to flow over the mushrooms loaded into the compartments of the storage structure.

13. Apparatus for the storage of harvested mushrooms, comprising a storage structure having a plurality of compartments with openings through and between the compartments to permit the free flow of air therethrough, in combination with a plurality of carriers for harvested mushrooms, each carrier being adapted to support the underside of the mushroom cap with the stalk projecting downwardly therefrom and each carrier when loaded with mushrooms being receivable in a compartment of the structure, said carrier being in the form of an elongate strip having an upper wall, said upper wall having opposite spaced apart longitudinal edges and a first surface extending between said edges for supporting the undersides of the mushrooms, and a web depending downwardly from said upper wall which web is adapted to support said first surface, the upper wall having a plurality of generally U-shaped recesses formed therein along the length of each of said longitudinal edges, said recesses opening to said longitudinal edges, whereby an individual mushroom may be located in each such recess by moving the mushroom laterally with respect to the length of the carrier.

14. Apparatus as claimed in claim 13, wherein the compartments of the structure are arranged in a rectangular matrix, each compartment being configured to accommodate a carrier supporting a row of mushrooms.

15. Apparatus as claimed in claim 13, wherein each carrier is in the form of an elongate strip, with a plurality of recesses arranged along the length of the strip.

16. Apparatus as claimed in claim 15, wherein each carrier has an upper wall, a lower wall, and a vertical wall holding the upper wall above the lower wall and the upper wall is formed with a plurality of recesses along each long edge of the upper wall.

17. Apparatus as claimed in claim 15, wherein each carrier is in the form of an inverted channel defined by an elongate base wall having opposite long edges and a pair of flanges depending from the long edges of the base wall, with a plurality of recesses along each long edge of the base wall of the channel.

18. Apparatus as claimed in claim 15, wherein each carrier is in the form of an elongate channel including a pair of upstanding flanges, a plurality of opposed holders disposed along the free long edge of each flange, and a plurality of elastic members stretched between opposed pairs of holders.

19. Apparatus as claimed in claim 13 wherein said upper wall has a first wall portion extending longitudinally along one of said edges, and a second wall portion extending longitudinally along the other of said edges, said first and second wall portions disposed at an angle to each other to form a substantially V-shaped upper wall to encourage mushrooms in said recesses to move away from said edges and be retained within said recesses.

* * * * *